US010241957B2

(12) United States Patent
Gupta et al.

(10) Patent No.: US 10,241,957 B2
(45) Date of Patent: Mar. 26, 2019

(54) WORKLOAD PATTERNS FOR REALISTIC LOAD RECREATION IN PERFORMANCE TESTING

(75) Inventors: Vikas Gupta, Bangalore (IN); Amit W. Gawande, Bangalore (IN)

(73) Assignee: Infosys Limited, Bangalore (IN)

( * ) Notice: Subject to any disclaimer, the term of this patent is extended or adjusted under 35 U.S.C. 154(b) by 39 days.

(21) Appl. No.: 13/492,628

(22) Filed: Jun. 8, 2012

(65) Prior Publication Data

US 2013/0205010 A1 Aug. 8, 2013

(30) Foreign Application Priority Data

Feb. 6, 2012 (IN) .............................. 421/CHE/2012

(51) Int. Cl.
| | | |
|---|---|---|
| G06F 11/00 | (2006.01) | |
| G06F 11/34 | (2006.01) | |
| G06F 17/30 | (2006.01) | |
| G06F 15/173 | (2006.01) | |

(52) U.S. Cl.
CPC ............ *G06F 15/173* (2013.01); *G06F 11/00* (2013.01); *G06F 11/3428* (2013.01); *G06F 11/3433* (2013.01); *G06F 17/30887* (2013.01); *G06F 11/3476* (2013.01); *G06F 2201/875* (2013.01)

(58) Field of Classification Search
USPC .................................................. 709/224, 227
See application file for complete search history.

(56) References Cited

U.S. PATENT DOCUMENTS

| | | | | |
|---|---|---|---|---|
| 6,286,046 B1 * | 9/2001 | Bryant | ................. | G06F 11/3414 709/204 |
| 8,065,410 B1 * | 11/2011 | Breen | ................... | H04L 67/025 702/182 |
| 8,903,986 B1 * | 12/2014 | Newstadt | ............ | H04L 63/1425 709/217 |
| 2004/0117460 A1 * | 6/2004 | Walsh | ................... | H04L 41/145 709/219 |
| 2004/0193699 A1 * | 9/2004 | Heymann | ......... | G06F 17/30873 709/218 |
| 2006/0015504 A1 * | 1/2006 | Yu | ...................... | G06F 17/30864 |
| 2006/0117091 A1 | 6/2006 | Justin | | |

(Continued)

FOREIGN PATENT DOCUMENTS

KR 2010119333 9/2010

OTHER PUBLICATIONS

Ruffo et al., "WALTy: A User Behavior Tailored Tool for Evaluating Web Application Performance," *Proceedings of the Third IEEE International Symposium on Network Computing and Applications (NCA'04)*, 2004, 10 pages.

(Continued)

*Primary Examiner* — Hermon Asres
(74) *Attorney, Agent, or Firm* — Klarquist Sparkman, LLP

(57) ABSTRACT

Various technologies related to uniform resource locator (URL) sequence patterns are described. Such patterns can be used to determine a distribution of a mix of the URL sequence patterns occurring within given URL sequences. A production environment URL log can be analyzed using the technologies described herein to recreate a production environment load in a test environment. Transaction sequences and strongly coupled relationships can be supported.

18 Claims, 13 Drawing Sheets

(56) References Cited

U.S. PATENT DOCUMENTS

| | | | | |
|---|---|---|---|---|
| 2007/0024707 | A1* | 2/2007 | Brodsky | G08B 13/1961 348/143 |
| 2008/0244408 | A1* | 10/2008 | King | G06F 17/30864 |
| 2012/0084605 | A1* | 4/2012 | Shilon | H04L 43/12 714/33 |
| 2012/0158894 | A1* | 6/2012 | Desgagne | H04N 21/6125 709/217 |
| 2012/0253733 | A1 | 10/2012 | Gawande et al. | |
| 2013/0271598 | A1* | 10/2013 | Mariadoss | G08B 13/19613 348/143 |
| 2016/0191591 | A1* | 6/2016 | Rider | G06F 17/30 709/219 |

OTHER PUBLICATIONS

Songwattana, "Mining Web Logs for Prediction in Prefetching and Caching," *Third International Conference on Convergence and Hybrid Information Technology*, 2008, pp. 1006-1011.

Xia et al., "Multi-level logs based web performance evaluation and analysis," 2010 *International Conference on Computer Application and System Modeling* (*ICCASM* 2010) vol. 4, pp. 37-41.

Quan et al., "Session-based performance test case generation for Web applications," *International Journal of Digital Content Technology and its Applications*, vol. 4, No. 4, Jul. 2010, 7 pages.

Pinzger et al., "AWPS—Simulation based automated web performance analysis and prediction," 2010 Seventh International Conference on the Quantitative Evaluation of Systems, 2 pages.

Gottry, "Monitoring application performance using websphere request metrics," Aug. 2007, 9 pages.

Cai et al., "Synthesizing Client Load Models for Performance Engineering via Web Crawling," *ASE* '07, Nov. 5-9, 2007, Atlanta, GA, ACM 10 pages.

Cherkasova et al., "Measuring and Characterizing End-to-End Internet Service Performance," *ACM Transactions on Internet Technology*, vol. 3, No. 4, Nov. 2003, pp. 347-391.

Shams, "A Model-Based Approach for Testing the Performance of Web Applications," *Proceedings of the Third International Workshop on Software Quality Assurance* (*SOQUA* '06) Nov. 6, 2006, Portland, OR ACM, 8 pages.

\* cited by examiner

WORKLOAD PATTERNS FOR REALISTIC LOAD RECREATION IN PERFORMANCE TESTING

BACKGROUND

Performance testing is an important part of software development. A software application may very well have the ability to perform its intended functions. However, if it does not do so in a reasonable amount of time with the allocated resources, the software application will waste time, disappoint users, and fail expectations. In recognition of the importance of performance to successful software development, software development agreements typically include minimum performance specifications. Software not meeting such requirements will not meet the terms of the development agreement.

So, to ensure that software will perform as expected, software developers include performance testing as part of the development process. In many cases, however, it is not possible or desirable to test the software in a production environment. Therefore, a testing environment is used. The testing environment, however, must closely match the production environment. Otherwise, testing is of limited use and will not uncover performance problems.

A particularly challenging problem is devising an accurate test environment for web applications, which may involve many simultaneous users engaged in complex interactions with a complicated system.

Although various approaches have been taken to address such difficulties, there is still a need to address the complexities of emulating a production environment for a web application in an efficient and accurate manner.

SUMMARY

A variety of techniques can be used for determining the uniform resource locator (URL) sequence pattern distribution that is present in a production environment. A tool can determine the sequence pattern distribution based on a URL log.

Considerable efficiency and accuracy improvements in the performance testing process can be realized.

As described herein, a variety of other features and advantages can be incorporated into the technologies as desired.

The foregoing and other features and advantages will become more apparent from the following detailed description of disclosed embodiments, which proceeds with reference to the accompanying drawings.

DETAILED DESCRIPTION

Example 1—Exemplary Overview

The technologies described herein can be used for a variety of uniform resource locator sequence pattern distribution scenarios. Adoption of the technologies can provide an accurate technique for simulating a production environment within a testing environment.

The technologies can be helpful to those wishing to simulate the amount of load on various server types during performance testing of a web-based application or website. Beneficiaries include software developers, who wish to provide an accurate testing environment when testing applications used by clients, internal or external. Such clients can also greatly benefit from the technologies because they enjoy web applications that are vetted by accurate performance testing.

Example 2—Exemplary System Employing a Combination of the Technologies

Figure 1:
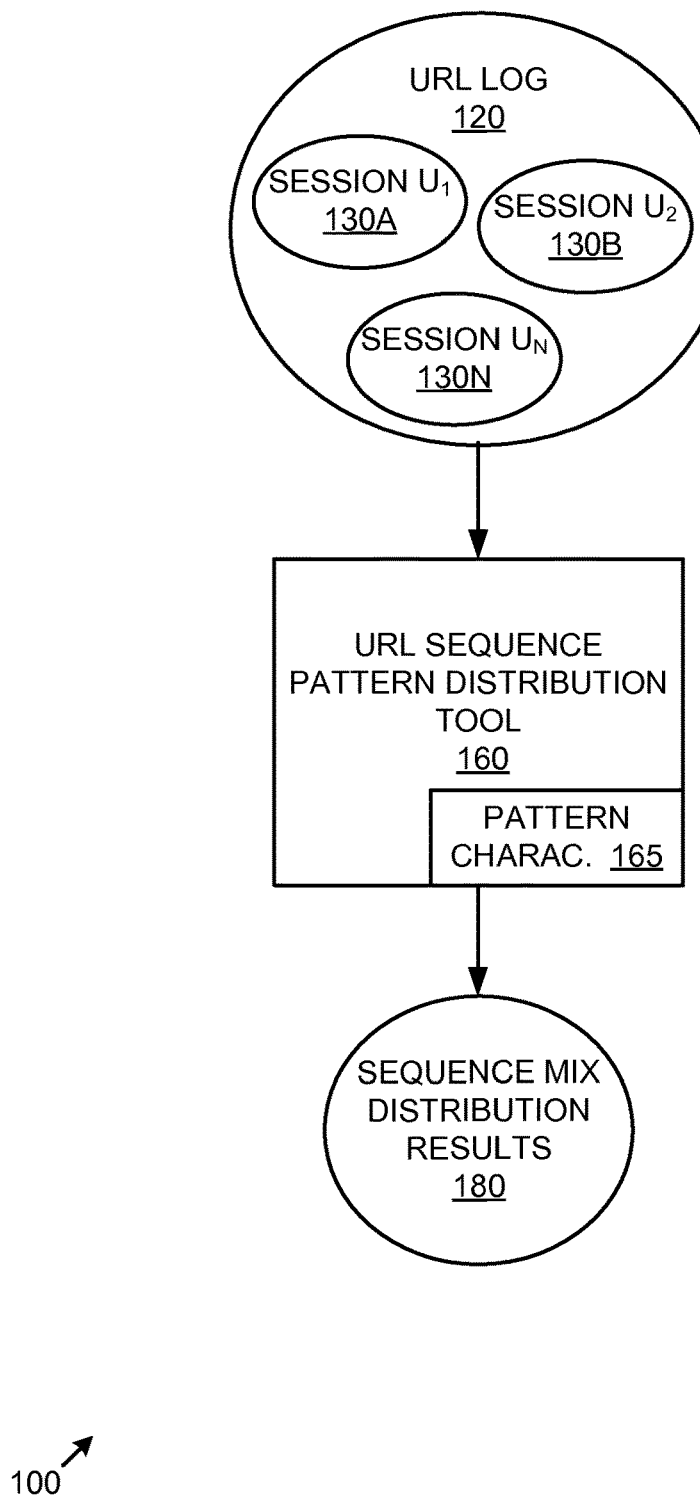
FIG. 1 is a block diagram of an exemplary system implementing the uniform resource locator sequence pattern distribution technologies described herein.

FIG. 1 is a block diagram of an exemplary system 100 implementing the URL sequence pattern distribution technologies described herein. In the example, one or more computers in a computing environment implement a URL sequence pattern distribution tool 160 that accepts as input a plurality of user sessions 130A-N found within a URL log 120 (e.g., a production environment URL log). The tool 160 includes pattern characteristics 165, which assist in generation of results 180 that indicate a distribution of a mix of URL sequence patterns.

In practice, the systems shown herein, such as system 100 can be more complicated, with additional functionality, more complex inputs, and the like.

As described herein, the tool 160 can handle a plurality of different types of patterns, and the pattern characteristics 165 can vary accordingly.

In any of the examples herein, the inputs, outputs, and tools can be stored in one or more computer-readable storage media or computer-readable storage devices.

Example 3—Exemplary Method of Applying a Combination of the Technologies

Figure 2:
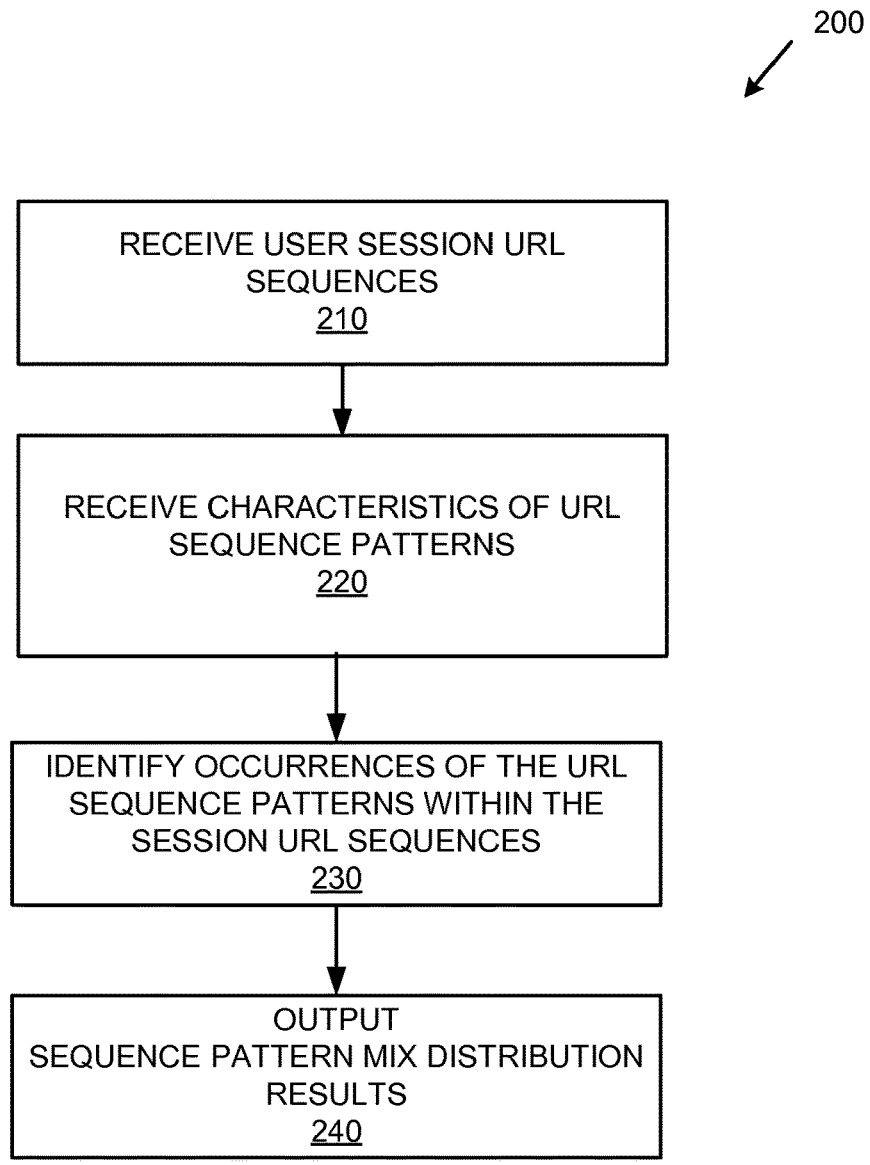
FIG. 2 is a flowchart of an exemplary method of implementing the uniform resource locator sequence pattern distribution technologies described herein.

FIG. 2 is a flowchart of an exemplary method 200 of implementing the URL sequence pattern distribution technologies described herein and can be implemented, for example, in a system such as that shown in FIG. 1. The technologies described herein can be generic to the specifics of operating systems or hardware and can be applied in any variety of environments to take advantage of the described features.

At 210, user session URL sequences are received. Such sequences can be present and extracted from a URL log, as described herein.

At 220, characteristics of a plurality of URL sequence patterns are received. In practice, such characteristics can be received once and applied to a plurality of user session URL sequences.

At 230, occurrences of the URL sequence patterns within the session URL sequences are identified via the characteristics. The occurrences can be tracked (e.g., counted) by URL sequence pattern as patterns are identified.

At 240, the sequence pattern mix distribution results are output.

The method 200 and any of the methods described herein can be performed by computer-executable instructions stored in one or more computer-readable media (e.g., storage or other tangible media) or stored in one or more computer-readable storage devices.

Example 4—Exemplary URL Sequence

In any of the examples herein, a URL sequence can be any sequence (e.g., series of) uniform resource locators. For example, for purposes of illustration, such a sequence can be as follows:

www.website.com/login
www.website.com/shop
www.website.com/buy
www.website.com/checkout For the sake of convenience, such a sequence or URLs can be referred to as $URL_A$, $URL_B$, $URL_C$, $URL_D$, or the like. A shorthand for such a sequence is simply: A, B, C, D.

In practice, URLs can be more complex and include parameters. Such parameters can be stripped out or ignored as desired for purposes of sequence storage, specification identification, and matching.

The general format of a URL can be scheme://domain: port/path. However, some of the parts (e.g., scheme, port, and the like) can be omitted during various of the processing described herein (e.g., to determine matches, occurrences, and the like).

Although the sequences herein are typically shown as contiguous, and are generally processed as such, in some cases a sequence may in fact be logically contiguous (e.g., the sequence is interleaved with other sequences of other sessions, but filtering on session results in a sequence that is contiguous).

Example 5—Exemplary Session URL Sequence

In any of the examples herein, a session URL sequence can be a sequence of URLs visited during a web browsing session (e.g., by a particular user). In practice, such a session is extracted from a URL log. To track sessions, a variety of session tracking mechanisms as described herein can be used to distinguish which URLs are visited by which user.

The session URL sequence is helpful in determining an accurate sequence pattern distribution because it can reflect the navigation of a user through various actual functions of the website.

Example 6—Exemplary Session Tracking Mechanism

In any of the examples herein, a session tracking mechanism can be any mechanism for tracking sessions. For example, a cookie, IP address, session identifier, user name, or the like can be used

Example 7—Exemplary URL Log

In any of the examples herein, a URL log can store the URL requests processed (e.g., received, successfully completed, or the like) by a website (e.g., a system of servers or other hardware providing access to a set of services by a web browser). In practice, a production log can be used because it reflects the actual URLs traversed in a live production environment. However, the technologies can also work on URL logs created from hypothetical users or derived from another log.

Such a log typically has a plurality of entries that indicate (e.g., document) the URL, a time visited, and may include other information, such as session tracking mechanism information. Or, the session tracking mechanism information can be extracted from other sources and incorporated into an enhanced log, which can be used as the URL log as described herein.

As described herein, a plurality of user session URL sequences can be extracted from a URL log.

As described herein, a website need not respect domain name boundaries. For example, different parts of a domain name may be handled by different servers, or multiple domains may be handled by the same servers.

The technologies can also be applied to subsystems within a website, such as particular applications, departments, divisions, or the like.

Example 8—Exemplary URL Sequence Pattern

In any of the examples herein, a URL sequence pattern can specify a template against which URL sequences can be matched to see if they fall within the pattern. Exemplary URL sequence patterns include transaction URL sequence patterns.

Such a pattern indicates an overall transaction by a user. In practice, such patterns are typically indicative of (e.g., representing) a basic function of the website, such as making a purchase, checking account details, transferring funds, registering as a user, signing up for enhanced membership, changing a password, or the like. Transactions can be fashioned to correlate with (e.g., represent) business functions.

Another type of URL sequence pattern is the one or more dropout transaction URL sequence patterns associated with a transaction URL sequence pattern. The dropout pattern can be any proper subsequence (e.g., starting with the same first URL as the transaction and at least one URL shorter than the transaction). In practice, the dropout transaction URL sequence pattern typically comprises at least two URLs. For example, for a transaction pattern A,B,C,D, dropouts would be A,B and A,B,C.

The dropout transaction URL sequence pattern is indicative of a transaction that was not completed (e.g., a user dropped out before completing purchase of an item, or the like). Because such an occurrence can be rather common, tracking dropout transactions can provide a more accurate picture of user browsing activity. As described herein, dropout transactions can be generated or detected without being explicitly specified or received.

The characteristics of a URL sequence pattern or any of its dropout patterns can be the sequence of particular URLs that indicate the pattern (e.g., $URL_A$, $URL_B$, $URL_C$, $URL_D$), signatures (e.g., hash) indicating particular URLs or the sequence, or the like.

Example 9—Exemplary URL Sequence Pattern: Strongly-Coupled

Another type of URL sequence pattern is indicated via a strongly-coupled relationship. The strongly-coupled relationship indicates that a second URL in the relationship will be preceded by one or more first URLs (e.g., to arrive at the second URL, a user must first go to a first URL). Although the relationship can be a one-to-one relationship, a plurality of such strongly-coupled relationships can effectively indicate a many-to-one relationship. Alternatively, the strongly-coupled relationship can simply be represented as a many-to-one (e.g., URL sources to URL target) relationship. The relationship indicates that to arrive at the second URL, a user must first go to any of a plurality of first URLs.

The characteristics of a strongly-coupled URL sequence pattern can be the target (e.g., second) URL and the one or more source (e.g., first) URLs.

In practice, the strongly-coupled relationships can be helpful for software developers to better understand and specify patterns. For example, it may be known that a certain page is arrived at from one of three starting points. By supporting such relationships, the technologies herein can allow the developers to specify a more accurate picture of how the website operates.

Example 10—Exemplary Single URLs

For purposes of distribution, a single URL is sometimes called a pattern. For example, a pattern distribution can include information on occurrences of single URLs. However, the single URL need not be specified or processed as a pattern that need be matched. Such single occurrence URLs are sometimes called "random" URLs because they are not met by any of the specified URL sequence patterns.

In any of the examples herein, the technologies can identify occurrences of single URLs outside of the uniform resource locator sequence patterns. Distribution results can include information indicating distribution of the occurrences of single URLs outside of the uniform resource locator sequence patterns.

Tracking occurrences of single URLs can be important because they can greatly affect the performance testing. For example, a single URL may involve consumption of a significant amount of resources.

Example 11—Exemplary URL Sequence Pattern Generation

In practice, the URL sequence patterns and their characteristics can be generated by an analyst who is familiar with operation of the software application. For example, an analyst can review code of the program, program specifications, URL logs, and the like to arrive at a suitable set of patterns.

Transaction sequence patterns can be specified to represent the transactions to which they correlate. Dropout patterns correlating to the transaction sequence patterns can be automatically generated or detected by the technologies without analyst involvement.

Strongly-coupled relationships can be specified to represent situations involving a second page (e.g., one or more second pages) that can only be reached by a first page.

Example 12—Exemplary URL Sequence Pattern Distribution

In any of the examples herein, a URL sequence pattern distribution can indicate the distribution of different sequence patterns detected within a URL log. The distribution typically indicates a mix of a plurality of different URL sequence patterns. For example, the distribution can indicate, for a plurality of URL sequence patterns, how many times respective patterns occur.

Measurement of how many times a pattern occurs can be indicated as a count, a percentage, or the like. In practice, results can be of different complexity than the example shown below:

TABLE

| Sequence Pattern Distribution | |
|---|---|
| Sequence | Occurrences |
| $Transaction_1$ | 456 |
| $Transaction_1$ $Dropout_1$ | 45 |
| $Transaction_1$ $Dropout_2$ | 12 |
| $Transaction_2$ | 865 |
| Strongly-coupled $A_1$ | 1342 |
| Strongly-coupled $A_2$ | 47 |
| Strongly-coupled B | 138 |
| Single $URL_1$ | 987 |
| Single $URL_2$ | 457 |
| Single $URL_3$ | 5 |

One useful aspect of the pattern distribution is that it can be used within a test environment to recreate the load characteristics of a production environment.

Example 13—Exemplary Sequence Pattern Hierarchy

Figure 3:
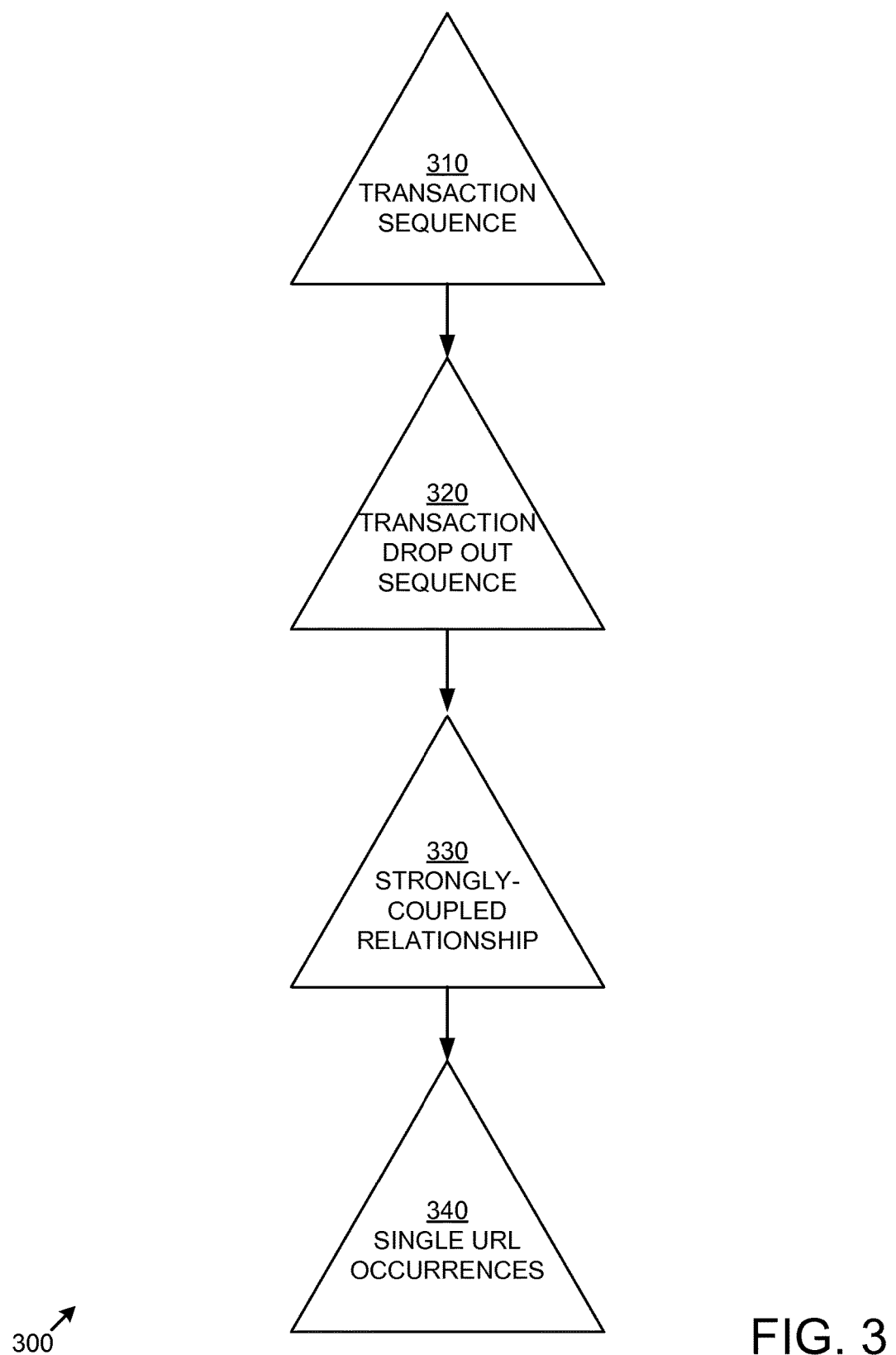
FIG. 3 is a block diagram of an exemplary hierarchy for prioritizing uniform resource locator sequence pattern identification.

FIG. 3 is a block diagram of an exemplary hierarchy 300 for prioritizing uniform resource locator sequence pattern identification and can be used in any of the examples herein.

The hierarchy 300 can be used whenever processing URL sequences (e.g., for pattern identification). For example, identification priority can be given to those higher in the hierarchy (e.g., transaction sequences 310 come first and get highest priority).

If a URL is not detected as being part of the top three 310, 320, 330, it can be considered a single URL occurrence 340.

Example 14—Exemplary System Identifying URL Sequence Patterns for Session

Figure 4:
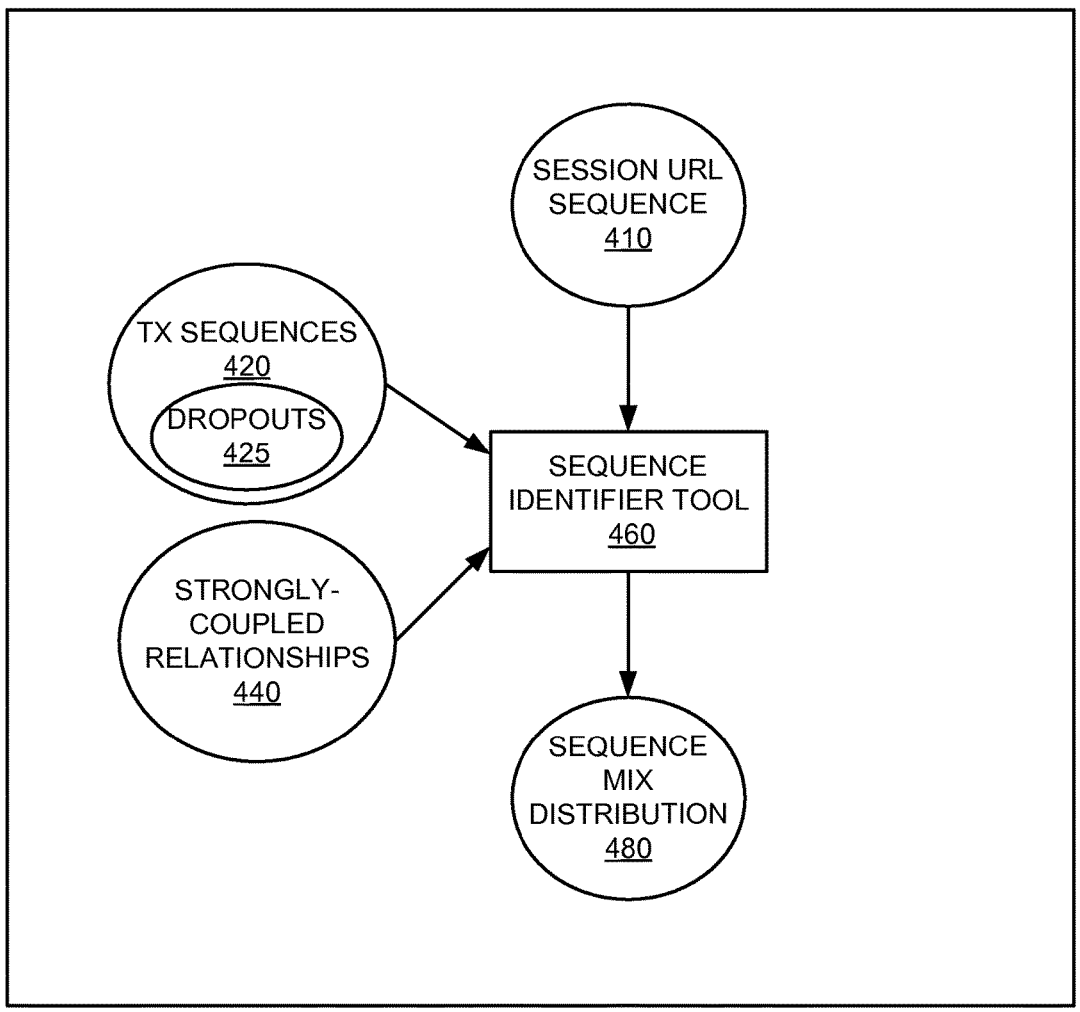
FIG. 4 is a block diagram of an exemplary system identifying URL sequence patterns in a single session.

FIG. 4 is a block diagram of an exemplary system 400 identifying URL sequence patterns in a single session. The tool 460 can be external to an overall tool for generating a distribution of URL sequence patterns or be provided from another source.

Inputs to the tool 460 can include the sequence 410 from a single URL session. Other inputs can include characteristics of sequence patterns, such as transaction sequences 420 (e.g., and corresponding dropout sequences 425, or the dropout sequences can be implicit) along with strongly-coupled URL relationships 440 as described herein. The sequence pattern characteristics can be stored (e.g., internally, by reference, or the like) by the tool 460 as it considers a plurality of sequences 410.

The tool 460 is configured to output the distribution of a mix of sequence patterns matching the input URL sequence 410. The tool 460 can include matching logic configured to accept the sequence 410 and detect a match between the uniform resource locator sequence and one of the uniform resource locator sequence patterns and tracking logic to track occurrences of matches detected by matching logic.

As described herein, a variety of features can facilitate accurate and efficient identification of patterns.

Figure 5:
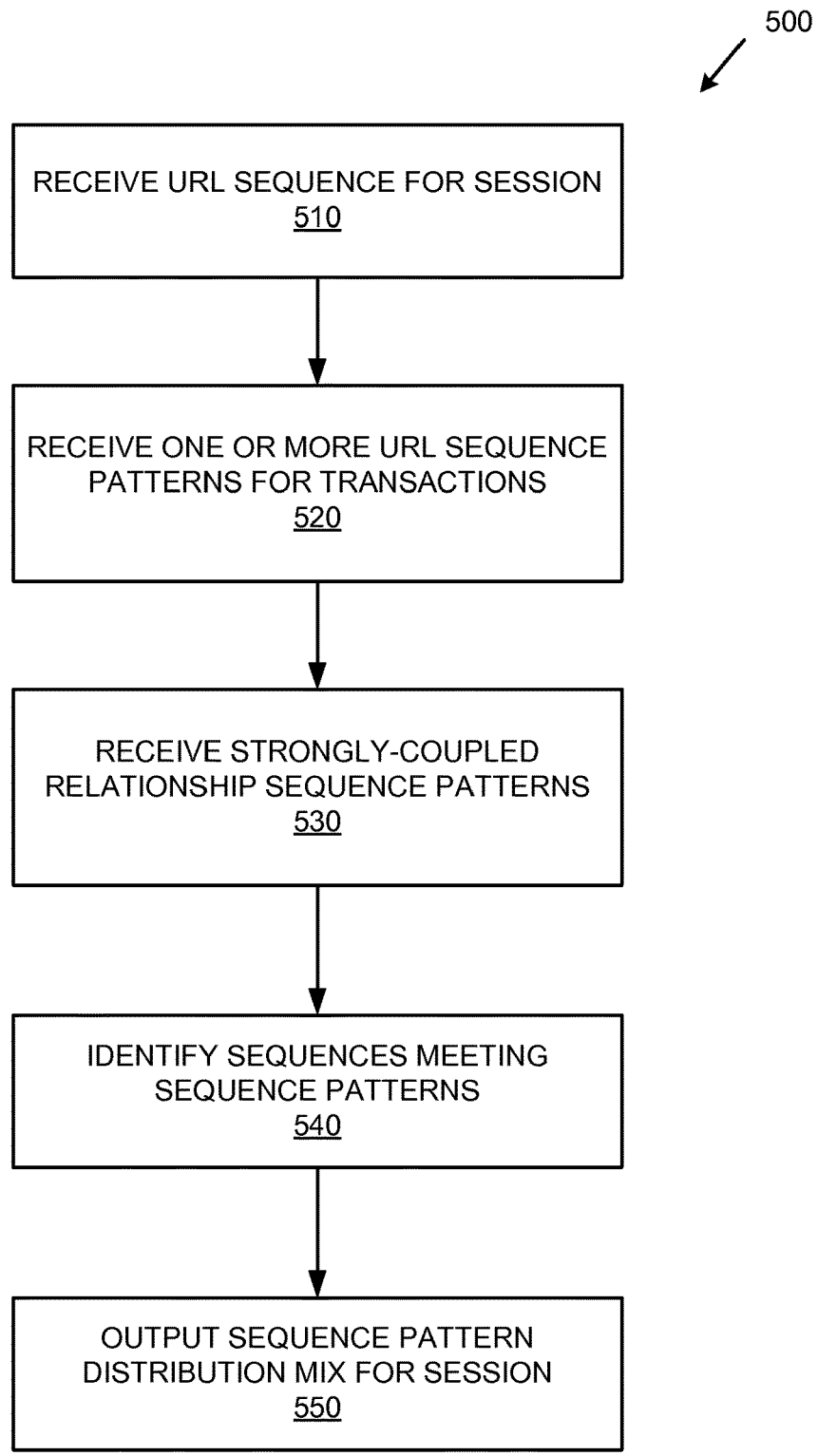
FIG. 5 is a flowchart of an exemplary method of determining a sequence pattern distribution mix from a URL sequence of a single session.

Example 15—Exemplary Method of Determining Sequence Pattern Distribution Mix FIG. 5 is a flowchart of an exemplary method 500 of determining a sequence pattern distribution mix from a URL sequence of a single session and can be implemented, for example, in a system such as that shown in FIG. 4.

At 510, a URL sequence for a single session is received. As described herein, such a sequence can be extracted from a URL log.

At 520, one or more URL transaction sequence patterns are received. URL subsequence patterns associated with transaction dropout URL sequence patterns can also be received. Alternatively, the dropout URL sequence patterns can be generated from the transaction URL sequence patterns or can be simply implied without being explicitly generated.

At 530, strongly-coupled URL relationships are received. Relationships between other URLs can be assumed to be loosely-coupled. Or, loosely-coupled relationships can be explicitly specified.

At 540, sequences in the URL sequence for the single session that meet (e.g., match) the transaction URL sequence patterns (e.g., or associated dropout sequence patterns) or the strongly-coupled relationship sequence patterns are identified. As described herein, single occurrence URLs in the URL sequence can also be tracked (e.g., those not matching any of the specified sequences or relationships).

At 550, the sequence pattern distribution mix for the session is output. Such information can be output to a counting tool that maintains a record of how many occurrences of the various sequences are observed in sessions. The entire process 510-550 can then be repeated for other sessions, and the results can be aggregated to arrive at an overall count or percentage for a URL log.

As described herein, the overall sequence pattern distribution mix can be useful for recreating a production environment within a test environment (e.g., by replicating the URL sequence pattern distribution mix in the test environment).

Example 16—Exemplary URL Preprocessor

Figure 6:
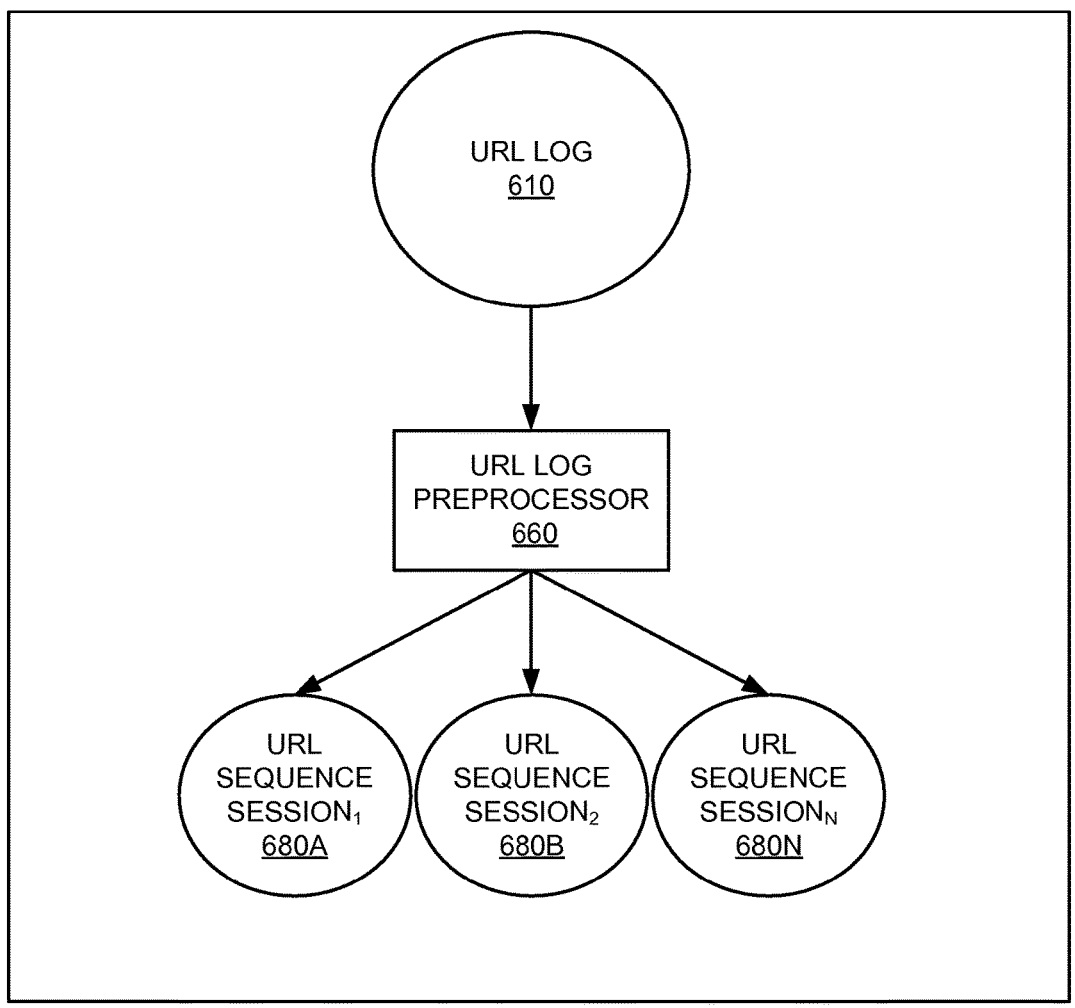
FIG. 6 is a block diagram of an exemplary system preprocessing a URL log.

FIG. 6 is a block diagram of an exemplary system preprocessing a URL log and can be implemented in any of the examples herein. In the example, the URL log preprocessor 660 takes a URL log 610 as input. The preprocessor is configured to output a plurality of URL sequences 680A-N for different respective user sessions present in (e.g., extracted from) the URL log 610.

Example 17—Exemplary Method of Sampling Program Files

Figure 7:
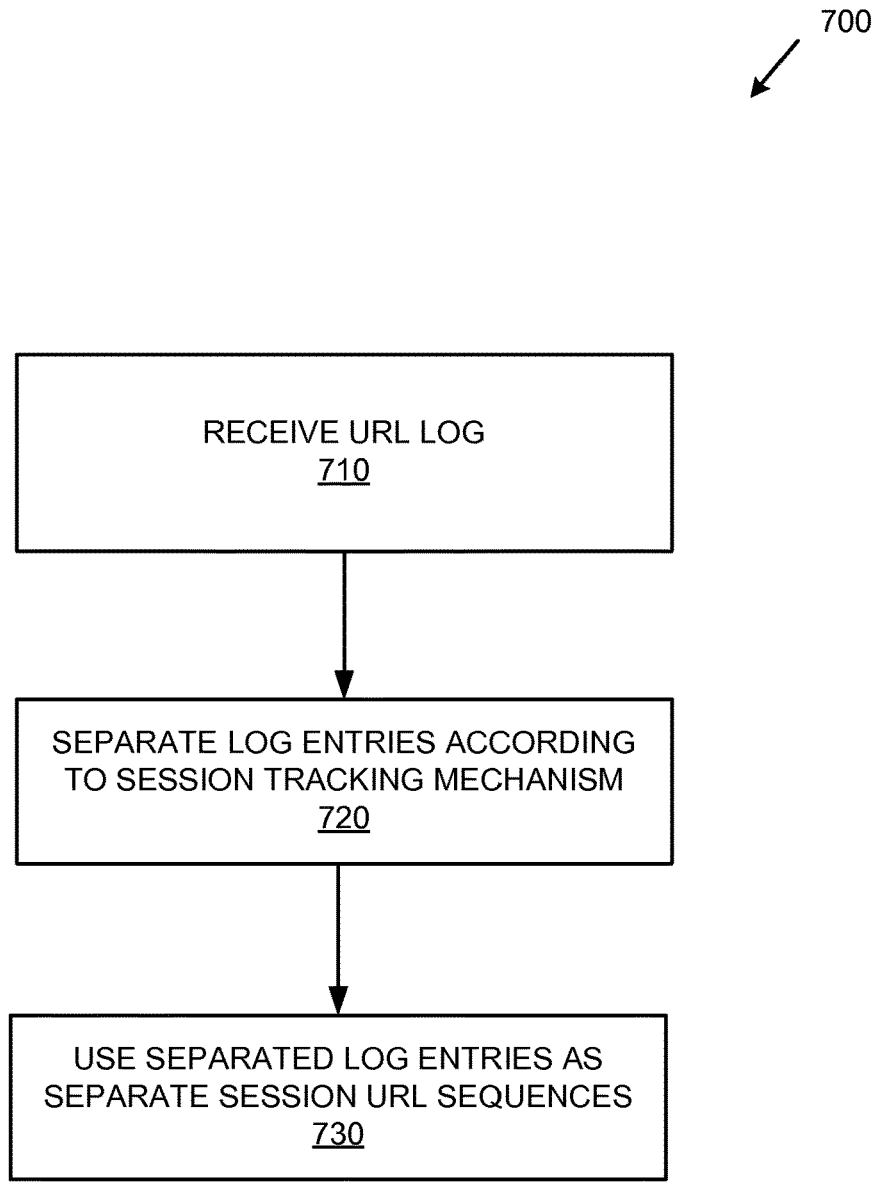
FIG. 7 is a flowchart of an exemplary method of preprocessing a URL log.

FIG. 7 is a flowchart of an exemplary method 700 of preprocessing a URL log and can be implemented, for example, in a system such as that shown in FIG. 6.

At 710, a URL log is received.

At 720, log entries in the URL log are separated according to a session tracking mechanism. In practice, a time threshold may also be used to prevent sessions that span excessive amounts of time (e.g., by separating lengthy sequences into different sessions). For example, log entries having a common session tracking mechanism can be grouped together, while preserving the sequence order.

At 730, the separate session URL sequences can be output. For example, the separate log entries can be used as separate session URL sequences (e.g., the plurality of uniform resource locator sequences for the plurality of respective user web site sessions). As described herein, such session sequences can then be analyzed to detect pattern matches therein.

Example 18—Exemplary Permitted Matches

Figure 8:
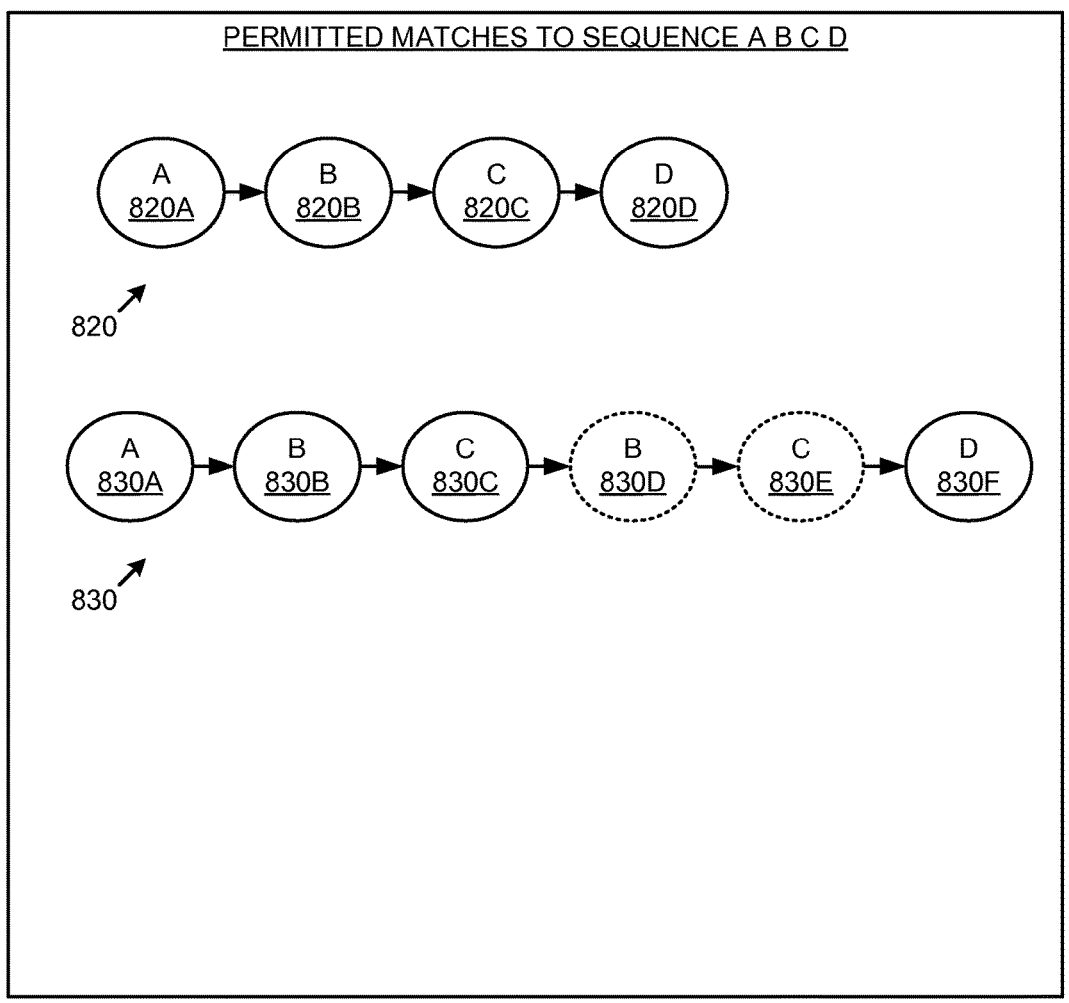
FIG. 8 is a block diagram of exemplary permitted matches to a sequence pattern.

FIG. 8 is a block diagram of exemplary permitted matches 800 to a sequence pattern and can be used in any of the examples herein to determine a match between a URL sequence and a URL sequence pattern (e.g., a transaction URL sequence pattern). As described, a transaction or dropout sequence pattern can match against a URL sequence that indicates the transaction (or portion thereof) has been completed, even if navigation backtracks during transaction processing. For example, a sequence related to a single transaction as indicated by the transaction sequence pattern can be considered a match, even if it does not strictly match the pattern.

In the example, a sequence pattern A, B, C, D is shown as matching against the following:

Sequence 820 (URLs 820A-D): A, B, C, D
Sequence 830 (URLs 830A-F): A, B, C, B, C, D The sequence 830 includes backtracking URLs 830D and 830E (URLs that have been visited before as part of the transaction). The matching as described herein can accommodate such backtracking and consider the sequence 830 to be a match against the A, B, C, D pattern, even though a strict one-for-one match of the URLs is not present. Thus, bi-directional movement within the sequence is still considered to be a match, even though there is not a one-for-one match.

Example 19—Exemplary Method of Detecting Match

Figure 9:
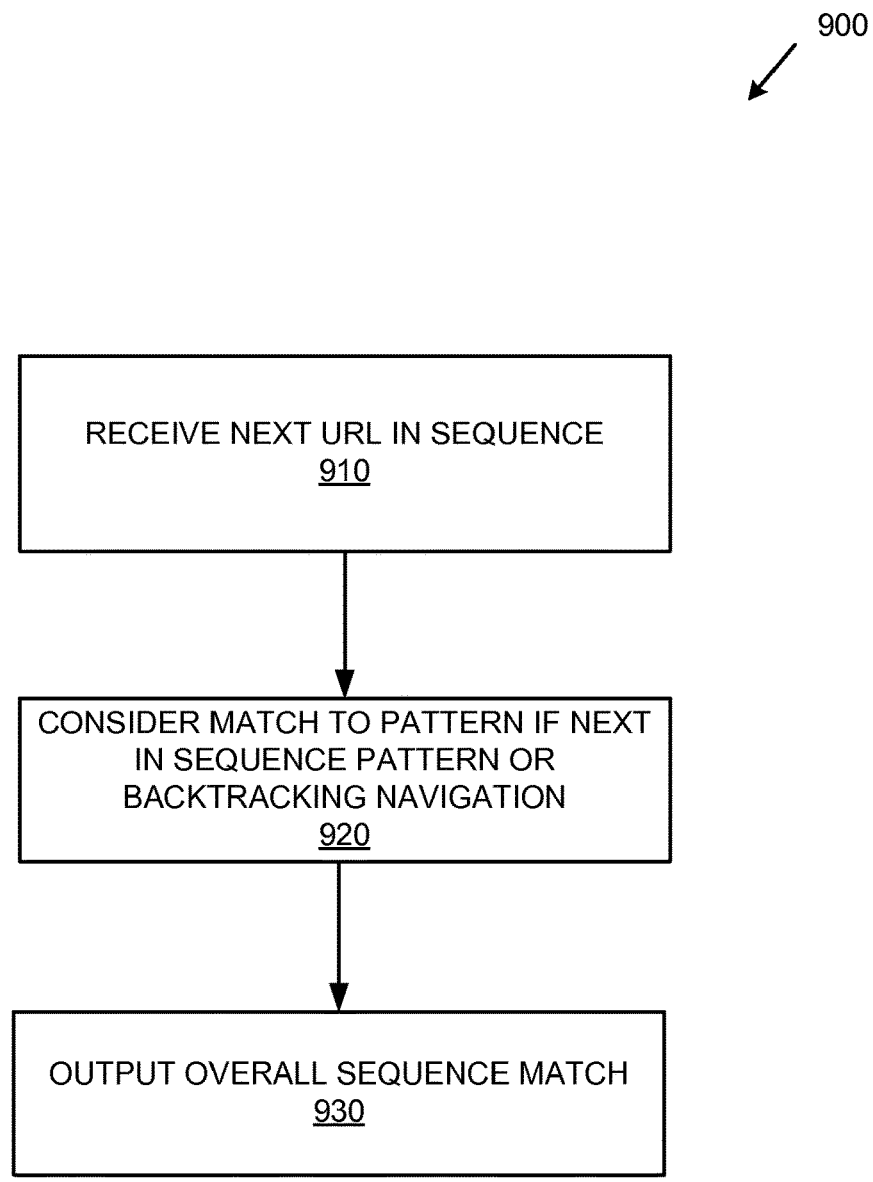
FIG. 9 is a flowchart of an exemplary method of matching a URL sequence pattern to a URL sequence.

FIG. 9 is a flowchart of an exemplary method 900 of matching a URL sequence pattern to a URL sequence and can be implemented, for example, to accommodate matching as shown in FIG. 8.

At 910, the next URL in a URL sequence being tested for matches against a pattern is received.

At 920, the given URL is considered to be a match if it matches the next URL in the sequence pattern or if the given URL indicates backtracking navigation (e.g., in a transaction). Testing can continue at 910 until an overall match is found, no match is possible, or the sequence ends.

At 930, the overall sequence match results are output (e.g., whether the input URL sequence matches any patterns, and if so, which pattern).

Example 20—Exemplary URL Sequence Parsing Trace

Figure 10:
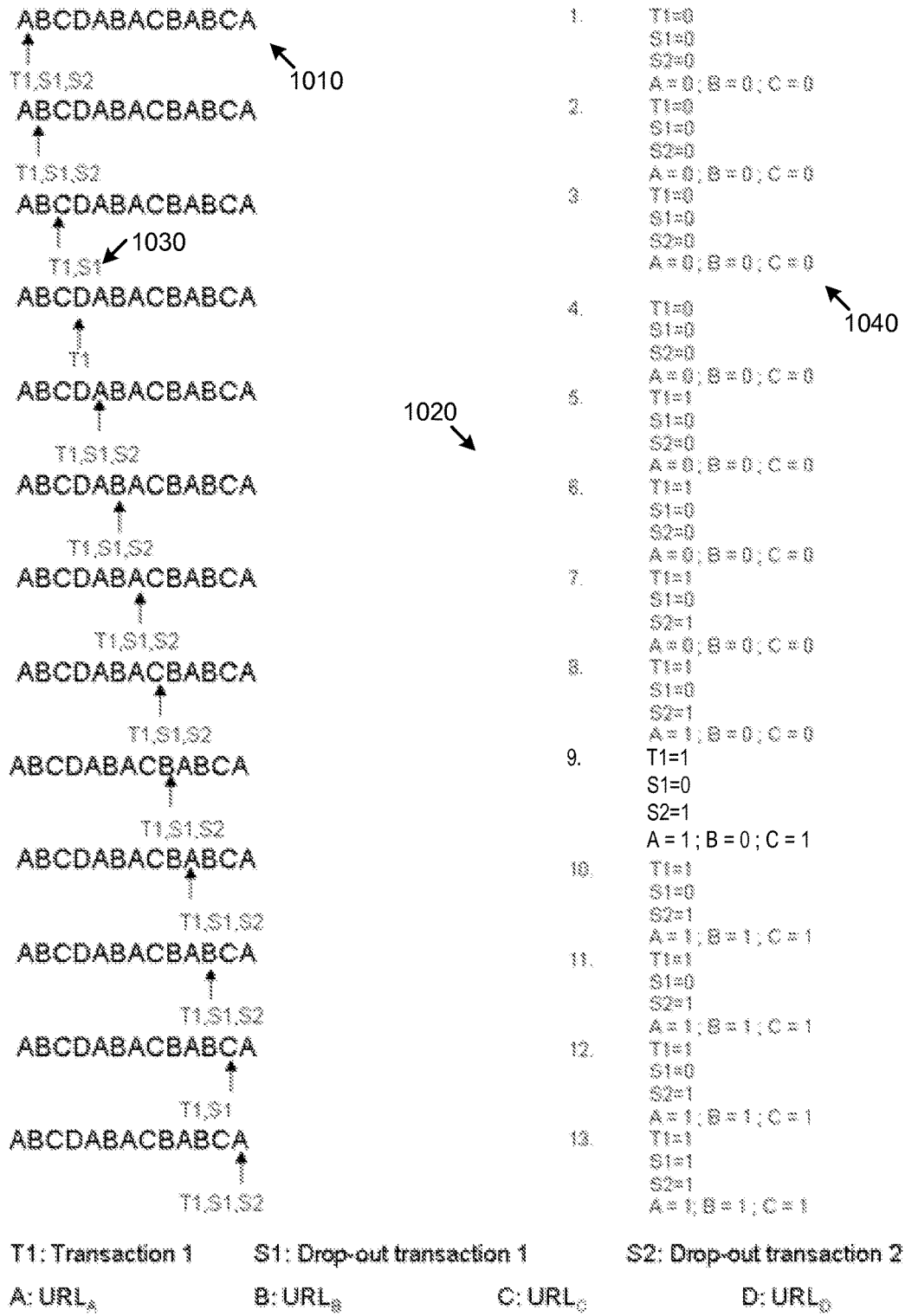
FIG. 10 is a trace of a method of parsing a URL sequence to detect matches against URL sequence patterns.

FIG. 10 is a trace 1000 of a method of parsing a URL sequence to detect matches against URL sequence patterns. In the example, the method is parsing an input sequence 1010 (ABCDABACBABCA) to detect matches against a transaction sequence pattern T1 (A, B, C, D) and its subsequence patterns S1 (dropout transaction pattern A, B, C) and S1 (dropout transaction pattern A, B).

Thirteen traversals 1020 through the input sequence are shown, starting with the first URL (A). Each traversal moves a current position through the input sequence. During traversal, the possible matches 1030 for the current position are tracked and updated as the sequence is traversed. A running count 1040 of the detected sequence patterns (e.g., including single occurrence URLs) is also tracked and updated during traversal.

In practice, more sequence patterns can be implemented, including strongly-coupled relationships.

Example 21—Exemplary Method for URL Sequence Parsing

Figure 11:
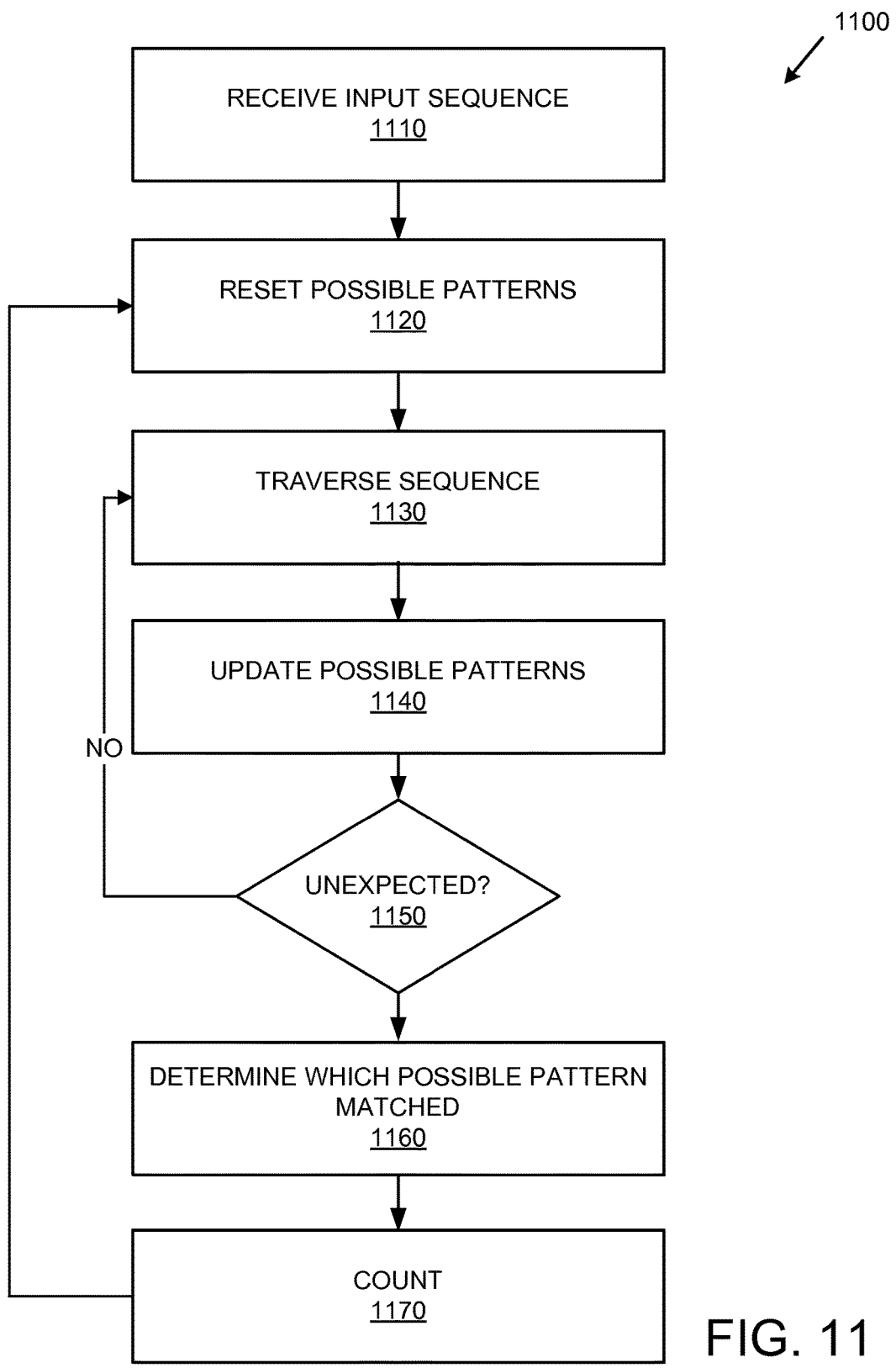
FIG. 11 is a flowchart of detailed exemplary method of matching a URL sequence pattern to a URL sequence.

FIG. 11 is a flowchart of an exemplary method 1100 of matching a URL sequence pattern to a URL sequence.

At 1110, the input URL sequence is received (e.g., a session URL sequence). Processing then begins at the start of the sequence.

At 1120, the possible sequence patterns are reset (e.g., any of the URL sequence patterns are possible because no URLs have yet been traversed). The method can be designed so that such an action is implied (e.g., sequence patterns are presumed possible until eliminated as impossible at the current position within the input sequence).

At 1130, the sequence is traversed. For example, the next (e.g., or first) URL in the sequence is considered. In practice, the method may skip traversal the first time through (e.g., the first URL in the sequence is effectively traversed immediately).

At 1140, the possible patterns are updated. For example, at the start of the input sequence if no sequence pattern begins with the first URL in the sequence, no patterns are possible at the current position. If two URL sequence patterns begin with the first URL, two URL sequence patterns are possible. As further traversal continues, patterns can be eliminated as possible for the current position.

At 1150, it is determined whether the current URL in the input sequence was expected. For example, if there are no URL sequence patterns that match, the URL is considered to be unexpected (e.g., not expected by any of the sequence patterns). If the process was detecting a transaction sequence pattern, and an unexpected URL occurred in the middle of the transaction sequence pattern, the process can indicate that a dropout transaction sequence pattern was detected (e.g., for sequences having at least two URLs).

If the input sequence is continuing to match one or more of the patterns, processing continues at 1130 by further traversal of the input sequence.

If the URL was unexpected, then at 1160, it is determined which possible pattern matched. If no pattern matched, then the URL can be considered a single occurrence URL.

At 1170, a count for the matching sequence pattern or single occurrence URL is updated (e.g., increased by one). Processing then continues at 1120, until the input sequence end is reached. Special processing at the end (e.g., to further update the count) may be needed in some cases.

The results can be aggregated with those from other input sequences as described herein.

Example 22—Exemplary URL Generator for Test Environment

Figure 12:
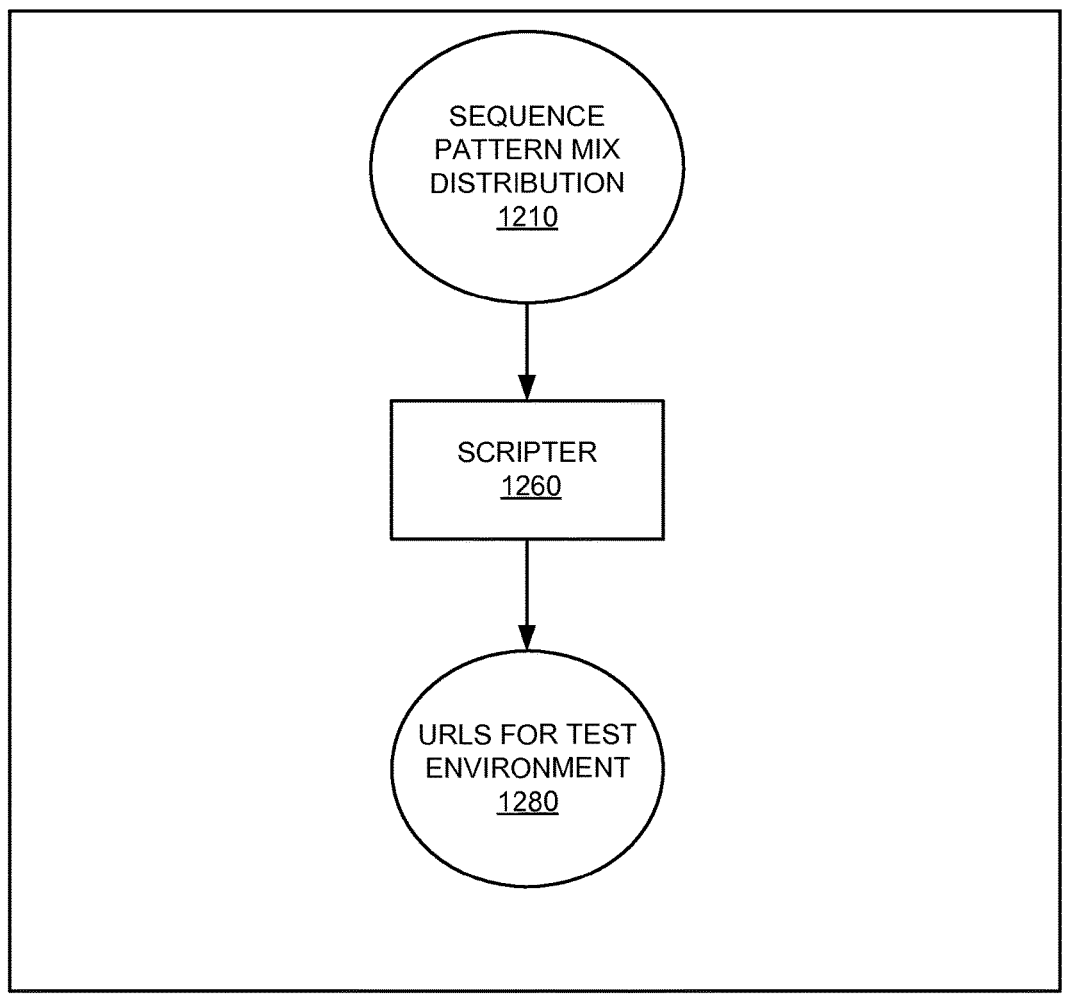
FIG. 12 is a block diagram of an exemplary system generating URL sequences for a test environment.

FIG. 12 is a block diagram of an exemplary system generating URL sequences for a test environment and can be implemented via the sequence pattern mix distribution generated in any of the examples herein. In the example, the scripter 1260 takes a URL sequence pattern mix distribution 1210 as input. The scripter 1260 is configured to output a plurality of URLs 1280 as output for a test environment.

The URLs 1280 can represent a plurality of different sequences by different users. In practice, the URLs from different sequences can be interleaved (e.g., mixed together) to better approximate a production environment.

The URLs can be generated as needed in real time, or as a list that can be submitted in a batch environment. Parameters can be added and/or determined via the test environment.

The scripter 1260 can also accept as input the time frame associated with the sequence pattern mix distribution (e.g., for a production log of 24 hours). The scripter 1260 can accept a multiplier (e.g., ×2) to multiply (e.g., double) the amount of URLs produced (e.g., to emulate two days' worth of URLs). Or, a target time frame (e.g., 6 hours) can be specified, and a multiplier factor can be automatically calculated (e.g., 0.25). Or, a number of desired URLs can be specified (e.g., 10,000).

Using the distribution 1210, the scripter 1260 can ensure that the URLs 1280 for the test environment have a similar distribution, however many are desired.

Example 23—Exemplary Recreation of Environment

As described herein, the technologies can be used to recreate a URL sequence pattern distribution. Such an approach can recreate a production environment. Such an approach can recreate the load on different servers (e.g., database, application, and the like). Such an approach can recreate (e.g., output) a distribution of a mix of URL sequence patterns.

Example 24—Exemplary Implementation

An exemplary implementation comprises a mechanism to assign a business-relevant definition to the miscellaneous requests coming to the production web server. The implementation parses the web logs and associates the sequence of URLs with dropout business transaction definitions or random browsing hits to the web server. The approach also indicates how the dropout and browsing hits dataset can be further used to simulate the production-like user behavior in a test environment.

In a workload analysis where tracking is conducted at a transaction level, transactions can be defined in terms of URLs traversed. A sequence of web page traversals to complete a business workflow can be defined as a transaction. Such analyses might ignore the sequences of these requests that do not align with the transaction definitions. Such requests might be termed as miscellaneous hits or requests on production logs. The implementation provides definition to web requests logged in the production logs and provides an approach to simulate a more exact production-like workload pattern on test environments.

The methodology suggested can use transaction definitions to define transaction dropouts and segregate them from random web browsing on the application. The transaction definitions can strictly relate to a business process flow and can be defined in terms of URL pages traversed. A transaction can be defined to uniquely identify the pattern of the sequence of events logged in the file so that each set thus formed is different from the others. The transaction definitions can be arranged to comply with the business understanding. For example, a typical transaction on a shopping cart application with business relevance will be searching a product or buying a product.

For instance, the following details can be used to parse the log files to segregate transactions, dropout transactions and random web browsing:
Transaction T1: $URL_A$->$URL_B$-$URL_C$->$URL_D$
$URL_A$, $URL_B$, $URL_C$, $URL_D$ are the URLs for page A, page B, page C and page D respectively of a web application. For further reference, $URL_A$, $URL_B$, $URL_C$, $URL_D$ will be referred to as A,B,C,D respectively.

The dropout transaction is the subset of the user-defined transactions. It is a path traversed by the user when the user does not complete the entire transaction for various possible reasons.

So the dropout transactions for the above-mentioned scenario will be defined as follows:
$URL_A$->$URL_B$->$URL_C$ for reference called "S1"
$URL_A$->$URL_B$ for reference called "S2"
An exemplary sequence of events logged in the web logs for a specific session or cookie can be as follows:

TABLE

Exemplary Session Sequence

| Date | Time | Request | Cookie | Time Taken |
| --- | --- | --- | --- | --- |
| 2010/11/09 | 10:00:00 | A | Vgr342swa | 2434 |
| 2010/11/09 | 10:00:04 | B | Vgr342swa | 4434 |
| 2010/11/09 | 10:00:10 | C | Vgr342swa | 3434 |
| 2010/11/09 | 10:00:15 | D | Vgr342swa | 1434 |
| 2010/11/09 | 10:00:18 | A | Vgr342swa | 2184 |
| 2010/11/09 | 10:00:22 | B | Vgr342swa | 3876 |
| 2010/11/09 | 10:00:27 | A | Vgr342swa | 7651 |
| 2010/11/09 | 10:00:38 | C | Vgr342swa | 2434 |
| 2010/11/09 | 10:00:50 | B | Vgr342swa | 3434 |
| 2010/11/09 | 11:00:00 | A | Vgr342swa | 2434 |
| 2010/11/09 | 11:00:04 | B | Vgr342swa | 4434 |
| 2010/11/09 | 11:00:10 | C | Vgr342swa | 3434 |
| 2010/11/09 | 11:00:15 | A | Vgr342swa | 1434 |

From the above shown log file sample, the transactions, dropouts, and random web hits can be clearly marked based on the above-mentioned definitions. In the example, the flows for the transactions, dropouts and random web hits are defined for each cookie or session id.

Referring to FIG. 10, a process can be used to parse through the logs and segregate the web pages into transactions, dropout transactions, and random web browsing activities.

The parser in the above-mentioned figure can walk through the URLs and, for a given URL, tries to validate it against the transaction and dropout definitions. It starts by validating against the first URLs of each of the defined transactions and dropouts. A success is followed by subsequent matches for the URLs.

A transaction holds good (e.g., matches) if the URLs apart from first and last are repeated in the subsequent validations because it is possible that a user re-visits a page in a transaction. When the parser finds a match for all the URLs in the transaction definition, starting from first to subsequent URLs and reaches the last URL, then a successful transaction is registered. If the parser is unable to find all the URLs and finds an unexpected URL, the possible dropout transaction comprising the parsed data set is marked.

Finally, when the entire log is parsed, the transactions, dropout transactions, and random web browsing are clearly segregated. The process can be simultaneously applied to the business transactions defined and their corresponding dropouts.

The above web log traversal process helps logically segregate the URLs into sequences compliant of business workflows. The identified set of the transactions, dropout transactions, and random web browsing can then be used to create a realistic usage pattern of the application. To simulate the following workload pattern during performance testing of the web application, the performance tester can create scripts for the entire transaction definitions and dropout transaction definitions; then, it can load the system with the workload pattern designed based on the above-mentioned log parsing process. The number of the transactions and dropouts to be replayed in the performance testing will be the aggregate of the cookies/session ids.

Example 25—Exemplary Implementation: Page Affinity

From the above segregation of web log hits, creation of load test scripts for transactions and dropouts can be created based on the URL traversal definition. But it is difficult to script the random web browsing hits because there will be some pages which can be accessed or arrived only after visiting a certain page. So, in order to create scripts for the random web browsing pages, the affinity between the pages can be defined.

The page affinity can be defined as 'Strongly Coupled' and 'Loosely Coupled.' The 'Strongly Coupled' pages of a web application are those which, when test scripted, need a predecessor page to arrive from. The 'Loosely Coupled' pages of a web application are those which, when test scripted, can independently be arrived at without a predecessor page. For example, a product page on a shopping cart application can be reached independently, but to buy a product, one needs to provide personal details. So, a product page is a loosely coupled page and buying a product is a strongly coupled page.

For instance, an application has the following set of 3 transactions:
Transaction T1: $URL_A$->$URL_B$->$URL_C$->$URL_D$
Transaction T2: $URL_A$->$URL_B$->$URL_E$
Transaction T3: $URL_B$->$URL_C$->$URL_E$
where $URL_A$, $URL_B$, $URL_C$, $URL_D$, $URL_E$ are the URLs for page A, page B, page C, page D and page E respectively of a web application.
For further reference, $URL_A$, $URL_B$, $URL_C$, $URL_D$ $URL_E$ will be referred to as A, B, C, D and E respectively. So, Transaction T1 is ABCD, Transaction T2 is ABE, and Transaction T3 is BCE.

Having found the transactions and dropouts for the above mentioned list of 3 transactions, the log parsing algorithm can provide the individual numbers of pages A, B, C, D and E under the random web browsing category. Out of the following 5 pages, page A, B and C are loosely coupled (e.g., their test scripts can be recorded without the need of any other page), whereas page D is strongly coupled with page C (e.g., in order to reach page D, the user has to certainly reach page C) and page E is strongly coupled with page B and C (e.g., in order to reach page E, the user has to certainly reach either page B or page C). This can be represented in a tabular form:

TABLE

Coupling Relationships

| Page URL | Loosely Coupled | Strongly Coupled | # of Pages Strongly Coupled | Predecessor Pages | Script Page Flows |
|---|---|---|---|---|---|
| A | Yes | No | NA | NA | A |
| B | Yes | No | NA | NA | B |
| C | Yes | No | NA | NA | C |
| D | No | Yes | 1 | C | C -> D |
| E | No | Yes | 2 | B, C | B -> E |
|   |     |     |   |     | C -> E |

The above table brings out the coupling of the pages with the other pages. Individual scripts can be recorded for the pages with loose coupling in the identified scripts page flows. Predecessors need be determined for pages with strongly coupling, and the script pages flows will be defined accordingly. If the coupling is correctly identified, then the script pages flows identified in the table above will also be observed in a sequence in the web logs as well. So, the test scripts for the sequences mentioned in the Script Page Flows column of the above table will then be prepared.

Attention can also be given to the workload distribution of the random web browsing pages (e.g., the number of requests corresponding to each of the Scripts page flows of the random web browsing pages that need to be simulated in the test environment). In order to find the number of such requests, the scripts page flow definition with the transaction definition and dropout definition can be used while parsing the web logs. The precedence of the sequences being identified from the logs can be as follows: first transaction, second dropouts, and then random web page script flows. This precedence can be used to parse the production logs using the above-mentioned process for each cookie/session id. The number of requests for the cookies (e.g., all of the cookies in the log) can be aggregated to identify the distribution of requests to be replayed in the test environment to simulate a production-like workload model.

Example 26—Exemplary Computing Environment

The techniques and solutions described herein can be performed by software, hardware, or both of a computing environment, such as one or more computing devices. For example, computing devices include server computers, desktop computers, laptop computers, notebook computers, handheld devices, netbooks, tablet devices, mobile devices, PDAs, and other types of computing devices.

Figure 13:
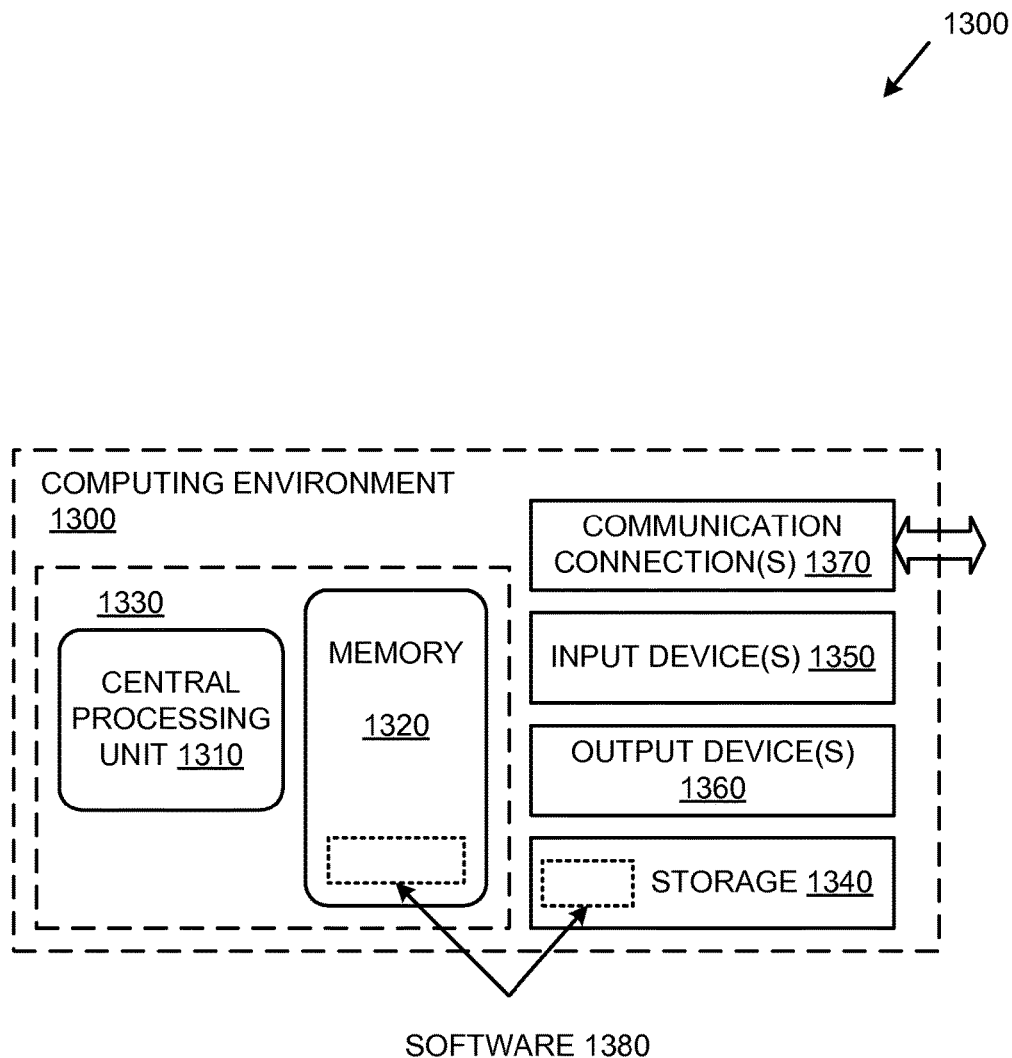
FIG. 13 is a block diagram of an exemplary computing environment suitable for implementing any of the technologies described herein.

FIG. 13 illustrates a generalized example of a suitable computing environment 1300 in which the described technologies can be implemented. The computing environment 1300 is not intended to suggest any limitation as to scope of use or functionality, as the technologies may be implemented in diverse general-purpose or special-purpose computing environments. For example, the disclosed technology may be implemented using a computing device comprising a processing unit, memory, and storage storing computer-executable instructions implementing the uniform resource locator sequence pattern distribution technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices With reference to FIG. 13, the computing environment 1300 includes at least one processing unit 1310 coupled to memory 1320. In FIG. 13, this basic configuration 1330 is included within a dashed line. The processing unit 1310 executes computer-executable instructions and may be a real or a virtual processor. In a multi-processing system, multiple processing units execute computer-executable instructions to increase processing power. The memory 1320 may be volatile memory (e.g., registers, cache, RAM), non-volatile memory (e.g., ROM, EEPROM, flash memory, etc.), or some combination of the two. The memory 1320 can store software 1380 implementing any of the technologies described herein.

A computing environment may have additional features. For example, the computing environment 1300 includes storage 1340, one or more input devices 1350, one or more output devices 1360, and one or more communication connections 1370. An interconnection mechanism (not shown) such as a bus, controller, or network interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other computer-readable media which can be used to store information and which can be accessed within the computing environment 1300. The storage 1340 can store software 1380 containing instructions for any of the technologies described herein.

The input device(s) 1350 may be a touch input device such as a keyboard, mouse, pen, or trackball, a voice input device, a scanning device, or another device that provides input to the computing environment 1300. For audio, the input device(s) 1350 may be a sound card or similar device that accepts audio input in analog or digital form, or a CD-ROM reader that provides audio samples to the computing environment. The output device(s) 1360 may be a display, printer, speaker, CD-writer, or another device that provides output from the computing environment 1300.

The communication connection(s) 1370 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Non-Transitory Computer-Readable Media

Any of the computer-readable media herein can be non-transitory (e.g., volatile or non-volatile memory, magnetic storage, optical storage, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A method, implemented by one or more computing devices, the method comprising:
   receiving a plurality of uniform resource locator sequences for a plurality of respective different user web site sessions for a web site;
   receiving characteristics of a plurality of uniform resource locator sequence patterns, wherein the uniform resource locator sequence patterns specify templates against which the plurality of uniform resource locator sequences are matched to determine whether the uniform resource locator sequences fall within the patterns, wherein the uniform resource locator sequence patterns comprise a dropout transaction uniform resource locator sequence pattern;
   identifying and counting, with the computing device, occurrences of the uniform resource locator sequence patterns within the uniform resource locator sequences for the plurality of different user web site sessions according to the templates, wherein the counting comprises measuring how many times a respective sequence pattern occurs, wherein at least one of the uniform resource locator sequences is matched to the dropout transaction uniform resource locator sequence pattern, the matching comprising detecting that the at least one of the uniform resource locator sequences represents a transaction on the web site that was not completed;
   identifying occurrences of single uniform resource locators outside of the uniform resource locator sequence patterns;
   based on the counted occurrences of the uniform resource locator sequence patterns and the identified occurrences of single uniform resource locators outside of the uniform resource locator sequence patterns, generating a distribution of a mix of the uniform resource locator sequence patterns occurring within the received plurality of uniform resource locator sequences for the plurality of different user web site sessions;
   generating a uniform resource locator sequence using the generated distribution of the mix of the uniform resource locator sequence patterns for the plurality of different user web site sessions, wherein the generating comprises interleaving uniform resource locators from the uniform resource locator sequence patterns for the plurality of different user web site sessions; and
   simulating user behavior during testing of the web site, wherein simulating user behavior comprises transmitting web requests comprising the uniform resource locators in the generated uniform resource locator sequence to the web site.

2. The method of claim 1 wherein:
   the characteristics of the plurality of uniform resource locator sequence patterns comprise sequences of particular uniform resource locators.

3. The method of claim 1 further comprising:
   receiving a uniform resource locator log comprising a plurality of uniform resource locator log entries indicating visits to the web site by a plurality of users;
   separating the log entries according to a session tracking mechanism; and
   using the separated log entries as the plurality of uniform resource locator sequences for the plurality of respective user web site sessions.

4. The method of claim 1 wherein:
   the uniform resource locator sequence patterns comprise at least one transaction uniform resource locator sequence pattern.

5. The method of claim 4 wherein:
   the identifying accommodates backtracking within a transaction, wherein the backtracking considers bi-directional movement within a given sequence pattern to be a match even when there is not a strict-one-for-one match of the given sequence pattern.

6. The method of claim 1 wherein:
   the dropout transaction uniform resource locator sequence pattern shares a first uniform resource locator with another of the uniform resource locators sequence patterns and is a proper subsequence of the another of the uniform resource locators sequence patterns.

7. The method of claim 1 wherein:
the uniform resource locator sequence patterns comprise at least one strongly-coupled uniform resource locator relationship.

8. The method of claim 7 wherein:
the strongly-coupled uniform resource locator relationship comprises a many-to-one relationship between a plurality of source uniform resource locators and a single target uniform resource locator.

9. The method of claim 1 wherein:
the identifying prioritizes transaction uniform resource locator sequence patterns ahead of dropout transaction uniform resource locator sequence patterns.

10. The method of claim 1 wherein:
the identifying prioritizes dropout transaction uniform resource locator sequence patterns ahead of strongly-coupled relationships.

11. The method of claim 1 further comprising:
based on the distribution of the mix of the uniform resource locator sequence patterns, outputting a plurality of uniform resource locators for a test environment.

12. A computing device comprising:
one or more uniform resource locator sequence patterns, wherein the one or more uniform resource locator sequence patterns comprise a dropout transaction uniform resource locator sequence pattern, wherein the dropout transaction uniform resource locator sequence pattern shares a first uniform resource locator with another of the uniform resource locators sequence patterns and is a proper subsequence of the another of the uniform resource locators sequence patterns; and
one or more non-transitory computer-readable media comprising instructions causing a computing system to perform:
  accepting session uniform resource locator sequences for multiple user website sessions for a web application and detecting matches within the session uniform resource locator sequences of one or more of the uniform resource locator sequence patterns, wherein at least one of the session uniform resource locator sequences is matched to the dropout transaction uniform resource locator sequence pattern, the matching comprising detecting that the at least one of the session uniform resource locator sequences represents a transaction for the web application that was not completed;
  tracking and counting one or more occurrences of the detected matches, wherein the counting comprises measuring how many times a respective uniform resource locator sequence pattern occurs across the multiple user website sessions;
  tracking occurrences of single uniform resource locators outside of the uniform resource locator sequence patterns;
  generating a distribution of a mix of the uniform resource locator sequence patterns across the multiple user website sessions according to the one or more tracked and counted occurrences of the detected matches and the tracked occurrences of single uniform resource locators outside of the uniform resource locator sequence patterns;
  generating a uniform resource locator sequence based on the distribution of the mix of the uniform resource sequence patterns, wherein the generating comprises interleaving uniform resource locators from the uniform resource locator sequence patterns across the plurality of different user web site sessions; and
  using the generated uniform resource locator sequence to simulate user behavior during testing of the web application, wherein the simulating the user behavior comprises transmitting web requests comprising the uniform resource locators in the generated uniform resource locator sequence to the web application.

13. The computing device of claim 12 wherein:
the distribution of the mix of the uniform resource locator sequence patterns indicate a count or percentage respective of the uniform resource locator sequence patterns.

14. The computing device of claim 12 wherein:
detecting a match supports backtracking within at least one of the uniform resource locator sequence patterns, wherein the backtracking considers bi-directional movement within a given sequence pattern to be a match even when there is not a strict-one-for-one match of the given sequence pattern.

15. The computing device of claim 12 wherein:
the uniform resource locator sequence patterns comprise at least one transaction uniform resource locator sequence pattern and at least one strongly-coupled relationship uniform resource locator sequence pattern.

16. The computing device of claim 12 wherein:
the uniform resource locator sequence patterns comprise at least one uniform resource locator sequence pattern representing a basic function of a website.

17. The computing device of claim 12 wherein:
the matching identifies the occurrences of single uniform resource locators outside of the uniform resource locator sequence patterns.

18. One or more non-transitory computer-readable storage media comprising computer-executable instructions that, when executed by a computer, cause the computer to perform a method comprising:
  receiving a plurality of uniform resource locator sequence patterns comprising a plurality of transaction uniform resource locator sequence patterns, a plurality of dropout transaction uniform resource locator sequence patterns, wherein at least one of the dropout transaction uniform resource locator sequence patterns shares a first uniform resource locator with another of the uniform resource locators sequence patterns and is a proper subsequence of the another of the uniform resource locators sequence patterns, and a plurality of strongly-coupled relationship sequence patterns;
  receiving a production uniform resource locator log for a production environment, wherein the log comprises a plurality of uniform resource locator log entries indicating visits to a web site in the production environment by a plurality of users;
  extracting a plurality of user session uniform resource locator sequences from the log;
  for the plurality of user session uniform resource locator sequences, identifying one or more occurrences of the uniform resource locator sequence patterns within the user session uniform resource locator sequences, wherein the identifying comprises matching at least one of the user session uniform resource locator sequences to one of the plurality of dropout transaction uniform resource locator sequence patterns, the matching comprising detecting that the at least one of the user session uniform resource locator sequences comprises an incomplete transaction on the website in the production environment by matching the at least one of the user session uniform resource locator sequences to the proper subsequence of the another of the uniform resource locators sequence patterns;

identifying occurrences of single uniform resource locators outside of the uniform resource locator sequence patterns;

generating a distribution of a mix of the uniform resource locator sequence patterns and single uniform resource locators occurring within the production uniform resource locator log, wherein the distribution indicates how many times the sequence patterns and single uniform resource locators occur within the production uniform resource locator log as a count or percentage;

generating a uniform resource locator sequence based on the distribution of the mix of the uniform resource locator sequence patterns, wherein the generating comprises interleaving uniform resource locators from the uniform resource locator sequence patterns in the distribution of the mix of the uniform resource locator sequence patterns; and using the generated uniform resource locator sequence to simulate production-like user behavior in a test environment, wherein the simulating the production-like user behavior comprises transmitting web requests comprising the uniform resource locators in the generated uniform resource locator sequence to a web site in the test environment.

* * * * *